(12) United States Patent
Westervelt (10) Patent No.: US 8,439,388 B1
(45) Date of Patent: May 14, 2013

(54) UNIVERSALLY PIVOTAL TOW BAR ASSEMBLY

(75) Inventor: Tod Westervelt, Gas, KS (US)

(73) Assignee: NSA RV Products Inc., Iola, KS (US)

( * ) Notice: Subject to any disclaimer, the term of this patent is extended or adjusted under 35 U.S.C. 154(b) by 674 days.

(21) Appl. No.: 12/654,759

(22) Filed: Dec. 30, 2009

(51) Int. Cl.
*B60D 1/167* (2006.01)

(52) U.S. Cl.
USPC .............. 280/494; 280/492; 280/493

(58) Field of Classification Search .......... 280/408, 280/456.1, 457, 460.1, 474, 476.1, 477, 478.1, 280/482, 490.1, 491.2, 493, 494, 495, 515, 280/491.1, 492
See application file for complete search history.

(56) References Cited

U.S. PATENT DOCUMENTS

| | | | |
|---|---|---|---|
| 2,871,030 A | 1/1959 | Hollis | |
| 4,711,461 A | 12/1987 | Fromberg | |
| 5,685,554 A * | 11/1997 | Poxleitner | ................. 280/491.2 |
| 5,765,851 A | 6/1998 | Parent | |
| 5,873,595 A | 2/1999 | Hinte | |
| 5,957,477 A | 9/1999 | Ensz et al. | |
| 6,502,847 B1 | 1/2003 | Greaves | |
| 6,612,604 B2 | 9/2003 | Greaves | |
| 6,755,589 B2 * | 6/2004 | Friesen | ......................... 403/141 |
| 6,764,092 B1 | 7/2004 | Greaves, Jr. | |
| 7,032,919 B1 * | 4/2006 | Hahne et al. | .................. 280/493 |
| 7,125,031 B1 | 10/2006 | Schoonover | |
| 7,390,007 B2 | 6/2008 | Helms et al. | |
| 8,056,919 B1 * | 11/2011 | Huston et al. | ................. 280/493 |
| 8,066,299 B2 * | 11/2011 | Olsen | ........................ 280/491.2 |
| 2004/0061309 A1 | 4/2004 | Shoffner | |

* cited by examiner

*Primary Examiner* — Kevin Hurley
*Assistant Examiner* — Marc A Scharich
(74) *Attorney, Agent, or Firm* — Dowell & Dowell, P.C.

(57) ABSTRACT

A tow bar assembly for use in connecting a towing vehicle to a towed vehicle wherein the tow bar assembly includes at least a cylindrical knuckle connected to a draw bar that is receivable within a receiver of the towing vehicle and wherein a pair of spaced flanges of a first end of a U-joint coupler are connected to the knuckle so as to pivot about a first pivot axis defined by an elongated central axis of the draw bar and a second pivot axis perpendicular to the first pivot axis and relative to a horizontal plane and where a pair of spaced flanges of a second end of the U-joint coupler are adapted to permit relative motion of the U-joint coupler about a third pivot axis with respect to a hitch mechanism that is adapted to be connected to the towed vehicle.

17 Claims, 6 Drawing Sheets

UNIVERSALLY PIVOTAL TOW BAR ASSEMBLY

BACKGROUND OF INVENTION

1. Field of Invention

This application is directed to a tow bar assembly for use in towing a motor vehicle from a towing vehicle and more particularly to a tow bar assembly that establishes universal movement between a towing vehicle, such as a motor home, and a towed vehicle, such as a car. The tow bar assembly is designed to be positioned between a conventional hitch receiver of a towing vehicle and may incorporate an adjustable double arm attachment for attachment to base plates secured to a towed vehicle.

2. Brief Description of the Related Art

Numerous towing devices have been created for facilitating the connection of a towing vehicle to another vehicle. In particular, in the field of motor homes or recreational vehicles, it is often desired to pull a smaller vehicle from the motor home so that the smaller and more fuel efficient vehicle may be used for local travel after arriving at a primary destination. With conventional towing devices, a hitch receiver is mounted to the towing vehicle, such as a motor home, and a storable hitch bar assembly is used to connect a vehicle to be towed to the hitch receiver.

To facilitate the storing of conventional towing devices, components of the devices were designed to be readily folded for compact storage when not in use. Further, to permit relative movement between a towing vehicle and a towed vehicle while establishing a safe and balanced connection between the two vehicles, many conventional towing devices have a pair of arms with outer free ends that are designed to be clamped to the towed vehicle in such a manner that the connection is created at a pair of spaced points relative to the towed vehicle so that the stresses created on the frame of the towed vehicle are distributed on opposite sides of a central elongated axis of the vehicle. The arms are conventionally pivotally connected to a bracket so as to be movable in a horizontal plane so that the arms may be spread apart relative to one another when being mounted to a towed vehicle and may be selectively pivoted together for compact storage.

Early towing devices were designed such that there was limited motion established between a towing vehicle and a towed vehicle. Without allowing for relative motion or movement between two vehicles, tremendous stresses are created on the hitch assemblies or towing devices which stresses often lead to failures of the devices. When a towed vehicle accidentally separates from a towing vehicle, the results are not only the possible damage or destruction of at least the towed vehicle but the possible injury or death to others in the area of the vehicles. Apart from the possible results of damage to property or injury to people, if the components of a towing device are not relatively movable, it is very difficult to establish a proper towing connection between two vehicles, especially if they are not initially properly aligned with one another.

To reduce the risks of possible damage to property or injury to people, many current towing devices have been designed to permit relative motion of the components of the towing devices to be established relative to and between a towing vehicle and a towed vehicle. Such more recent towing devices have also been design to be adjustable in two or more planes so as to facilitate the connection between a towing vehicle and a towed vehicle. Often, vehicles are not aligned vertically, horizontally or laterally relative to one another when being connected to a towing device. If a towing or hitch device is adjustable in three planes, a proper connection may be established between a towing vehicle and a towed vehicle regardless of their relative positions with respect to one another.

One of the problems associated with towing devices that permit generally universal adjustment of one or more towing arms relative to a towed vehicles is that the components of such devices are often complex and thus expensive to manufacture and difficult to install and maintain. Also, current conventional towing devices which create universal adjustment between two vehicles, are defined by three horizontally spaced pivot axes, one axis allowing motion within a horizontal plane, another allowing motion in a vertical plane and the last allowing rotational motion about an elongated axis of the hitch receiver of the towing vehicle. The spacing of the points of pivotal motion not only increases the cost of manufacture but also increases the length of the overall towing device. The more elongated a towing device is, the less rigid it becomes and the resistance to stress along the length of the device is reduced.

In view of the foregoing, there is a need to develop a towing device that is universally adjustable to both facilitate the initial connection of a towing vehicle to a towed vehicle and thereafter to permit relative movement, in three planes, between the two vehicles when they are connected with one another. By allowing relative movement in three planes between a towing vehicle and a towed vehicle, most of the load on the towing device is directed along the length thereof which results in a balanced force being directed to the towing vehicle making handling of the towing vehicle much easier and safer.

SUMMARY OF THE INVENTION

This invention is directed to a universally adjustable towing device for connecting a towed vehicle, such as a automobile, from a towing vehicle, such as a motor home or bus. The towing device or tow bar assembly includes a cylindrical knuckle fixedly secured to a draw bar and a one piece double ended U-joint coupler or component. The draw bar is preferably formed of 2"×2" tubular steel that is selectively seated and retained within an open receiver that is mounted in a conventional manner to a rear frame component of the towing vehicle. The knuckle includes a pair of vertically open slots that are aligned on opposite sides thereof and that taper inwardly toward a central opening in the knuckle which opening is of a size to receive a mounting bolt there through. The slots preferably extend at least 40° above and below a centerline extending between the centers of the oppositely oriented slots. In this manner, the mounting bolt extending through the slots may pivot or rotate at least 80° about an elongated axis of the draw bar. A nylon or plastic sleeve is slidably mounted over the knuckle. The sleeve has a pair of aligned openings therein which are aligned with the slots in the knuckle when the sleeve is mounted on the knuckle. The openings are of a size to cooperatively receive a ⅝" diameter shoulder bolt that is used to connect a first end of the U-joint coupler to the knuckle.

Each end of the U-joint includes a pair of spaced and generally parallel flanges having aligned openings therein. The pair of flanges that extend from the first end of the U-joint are oriented parallel to one another in a vertical plane and are spaced apart a distance to fit along opposite sides of the sleeve surrounding the knuckle. The openings in the flanges are compatible with the size of the shoulder bolt that is used to connect the U-joint to the knuckle. After the first end of the U-joint is placed over the sleeve mounted about the knuckle, the shoulder bolt is passed through the aligned openings in the first end of the U-joint, the aligned openings in the sleeve and the aligned slots in the knuckle and is secured in place such as by a conventional lock nut. When mounted to the knuckle, the U-joint is pivotal with the sleeve about the longitudinal axis of the drawbar as well as in a vertical plane by pivoting about the axis of the shoulder bolt. Thus the knuckle forms two pivot axis for the tow bar assembly which intersect with one another.

A third pivot axis of tow bar assembly is created at the second end of the U-joint wherein the aligned openings in the spaced flanges thereof allow passage of another shoulder bolt that extends through openings in a pair of U-shaped brackets by way of which a pair of towing arms are mounted to the U-joint. The two flanges of the second end of the U-joint are oriented in spaced parallel horizontal planes so that the third pivot axis is about a vertical axis of the second shoulder bolt.

Each of the towing arms includes inner and outer portions wherein the outer portions are secured to their respective U-shaped mounting brackets that have upper and lower flanges having aligned openings therein through which the second shoulder bolt extends to mount the arms to the second end of the U-joint. The inner portions are telescopically adjustable relative to and within the outer portions and mounting clevises or brackets are pivotally mounted about mounting bolts that secure the brackets to an outer free end portion of the inner portions of the arms. In this manner, the clevises or mounting brackets that are to be secured to base plates that are secured to the front frame of the towed vehicle are pivotal in a horizontal plane to facilitate the alignment of the brackets with the brackets on the vehicle. To further aid in the alignment of the clevises with the base plates, the openings for receiving the mounting bolts in the free ends of the inner portions of the arms are slotted and taper inwardly to a central open passage such that the mounting bolts may pivot in a second plane through an arc of 150 to 200 about an elongated central axis of the each arm. The inner portions of each arm are telescopically mounted within the outer portions such that the inner portions may be selectively deployed or, by adjustment of cams mounted through the outer portions of each towing arm, may be selectively retracted within the outer portions so as to permit compact storage of the two bar assembly when not in use. To this end, a conventional stowage bracket is fixedly mounted to the second end of the U-joint.

It is the primary object of the present invention to provide a compact and universally adjustable tow bar assembly that can be easily mounted between a towing vehicle and a towed vehicle even if the two vehicles are not aligned with one another and wherein the tow bar assembly creates first and second pivot axes in a common plane with one axis being about an elongated axis of the drawbar and the other being about a horizontal axis and wherein a third pivot axis is established about a vertical bolt that connects the towing arms of the assembly with a U-joint that is movable relative to the three axes.

It is also an object of the present invention to provide a knuckle and U-joint assembly that may be used to connect conventional towing arms used to mount tow bar assemblies to a towing vehicles to draw bar receivers associated with towing vehicles.

It is another object of the invention to provide a tow bar assembly that will automatically align a towed vehicle relative to a towing vehicle regardless of any difference in the terrain over which the vehicles are passing and such that forces transmitted toward the towing vehicle from the towed vehicle will be properly aligned relative to a centerline from the front to the rear of the towing vehicle.

It is a further object of the invention to provide a tow bar assembly having tow bar arms so as to have connection clevises or brackets, for securing the arms to base plates mounted to a towing vehicle, that are pivotal about two axes to thereby facilitate attachment of the arms to the towed vehicle.

It is also an object of the invention to provide very compact tow bar assembly have very few components such that the cost of manufacturing is reduced while the strength and robustness of the assembly is maintained.

BRIEF DESCRIPTION OF THE DRAWINGS

A better under standing of the invention will be had with reference to the accompanying drawings wherein.

DESCRIPTION OF THE PREFERRED EMBODIMENT

Figure 2:
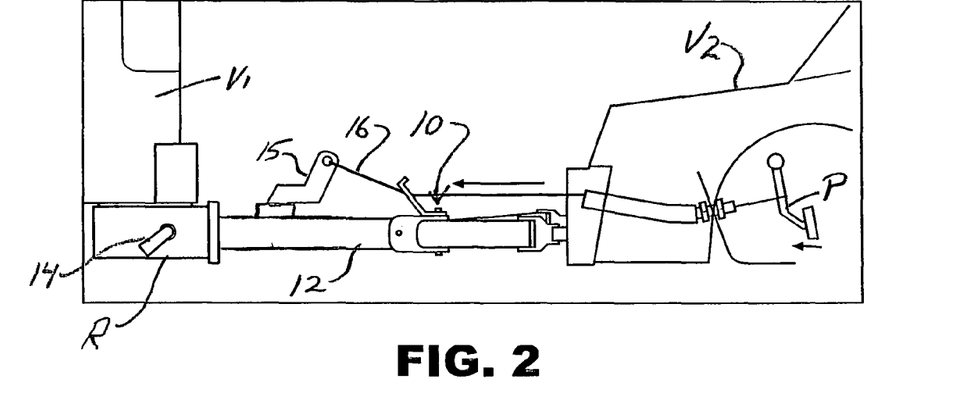
FIG. 2 is an illustrational view showing the tow bar assembly of FIG. 1 mounted between a towing vehicle and a towed vehicle.

With continued reference to the drawings, the tow bar assembly 10 is shown in FIG. 2 as being used to connect a towing vehicle "V1", such as a bus or motor home, to a towed vehicle "V2", such as car or small truck. As illustrated, a receiver "R" is welded or otherwise secured to a rear frame member of the towing vehicle and is of a size to selectively receive a draw bar 12 of the tow bar assembly. In preferred embodiments, the draw bar is formed of squared tubular steel such as 2"×2" steel tubing of a size to be slidably received within the receiver "R" with little to no lateral play of clearance there between. A J-shaped locking pin 14 is used to secure the draw bar within the receiver "R". Pivotally mounted on and within the draw bar is a safety brake lever 15 that is connected by way of a cable 16 to a brake pedal "P" of the towed vehicle. The safety brake mechanism operates in a known manner to apply the brakes of the towed vehicle should the tow bar connection between the two vehicles fail for any reason.

Figure 5A:
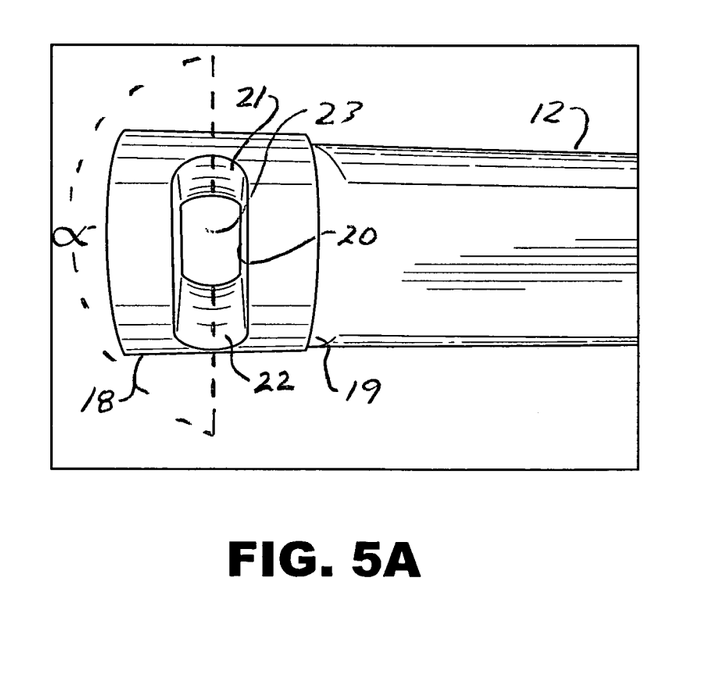
FIG. 5A is a side view of the knuckle of the invention mounted to a draw bar and showing one of two aligned open slots therein which slots permit motion of the U-joint about an elongated axis of the draw bar.
Figure 6:
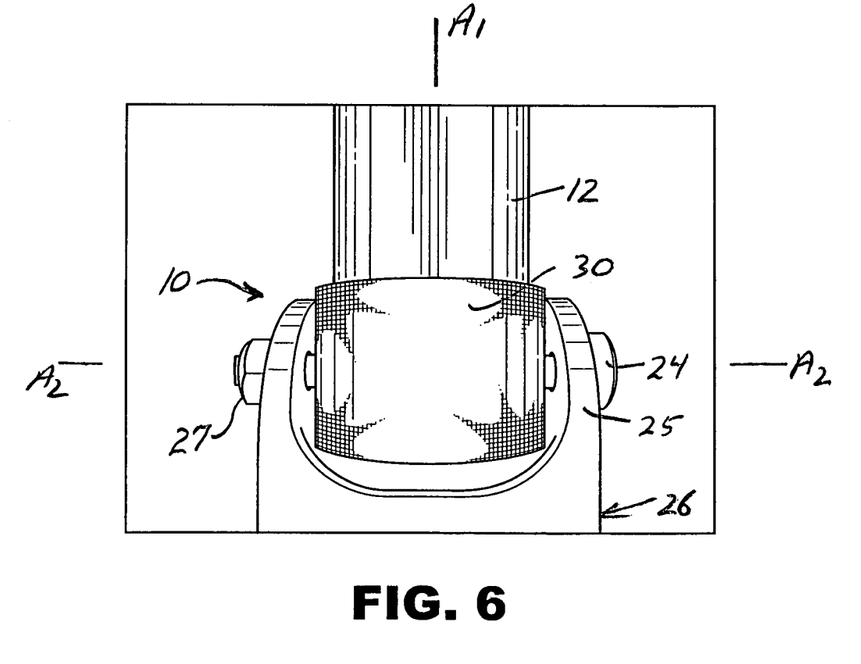
FIG. 6 is a top plan view of the first end of the U-joint bolted to the knuckle so as to be pivotal vertically about the bolt and showing that the vertical pivot axis is in the same plane as the rotational axis.

With reference to FIG. 5A, the tow bar assembly includes a cylindrical knuckle 18 which is welded or otherwise secured to an outer end 19 of the draw bar 12. The knuckle is formed of steel and has a pair of aligned slotted and tapered openings 20 formed therein with only one being shown in FIG. 5A. Another slotted opening is provided on the opposite side of the knuckle from the one shown in the drawing figure. The slotted openings 20 are shown as being defined by upper and lower tapered walls 21 and 22 that converge to a central opening 23 within the knuckle. Preferably the walls 21 and 22 taper at generally not more than 40° above and below a horizontal plane taken through the knuckle thus forming a slot having an open angle α of approximately 80°. In some instances this angle may be increased or decreased. The slots with angled walls receive a shoulder bolt 24 that is used to mount a first end 25 of a U-joint coupler 26 to the knuckle as is shown in FIG. 6. The bolt 24 is secured in place by lock nut 27. When the U-joint 26 is mounted to the knuckle as is illustrated in FIG. 6, the bolt 24 and thus the U-joint 26 are free to rotate within the opposing slotted openings a full 80° about an elongated axis "A1" of the draw bar 12.

Figure 5B:
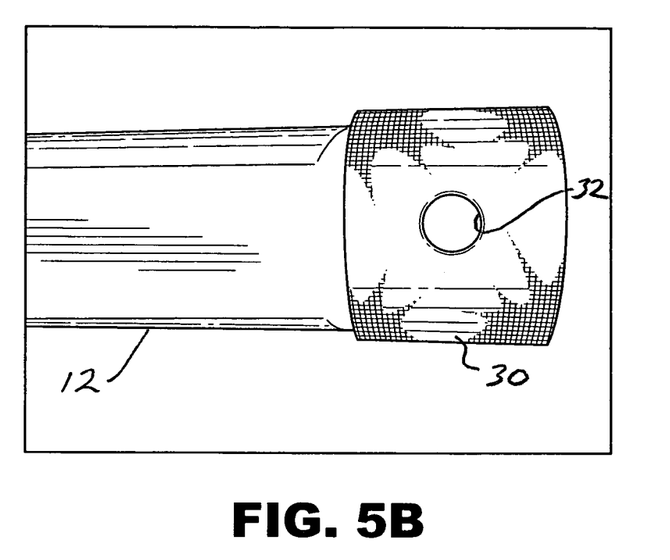
FIG. 5B is a view from the opposite side of the knuckle of FIG. 5A showing a low friction sleeve mounted over the metal portion of the knuckle that is shown in FIG. 5A.

To facilitate the relative rotational movement of the U-joint 26 relative to the knuckle 18, a low friction sleeve 30 is mounted about the knuckle as shown in FIG. 5B. The sleeve may be formed of nylon or other sturdy material that provides a low coefficient of friction to be developed between the sleeve and the metal of the knuckle so that relative rotation of the sleeve relative to the fixed knuckle is enhanced. The sleeve includes a pair of aligned openings 32 in opposite sides thereof that align with the slotted openings 20. The openings 32 in the sleeve are, however, only of sufficient diameter to allow passage of the shoulder bolt 24 there through. Thus, the sleeve 30 rotates with the bolt 24 and the U-joint 26 about the elongated axis "A1" of the draw bar 12. Further, due to the mounting of the U-joint to the knuckle 18, the U-joint is also pivotal in a vertical plane relative to the knuckle about an axis "A2" defined by a central elongated axis of the bolt 24. Further, it should be noted that the axes "A1" and "A2" are in a common plane and, unlike the prior art, these axes are not spaced from one another. By establishing these two axes in the same plane, the tow bar assembly is reduced in size and is thus less expensive to manufacture and more compact to increase the strength of the assembly and to make storage easier when not in use.

Figure 3:
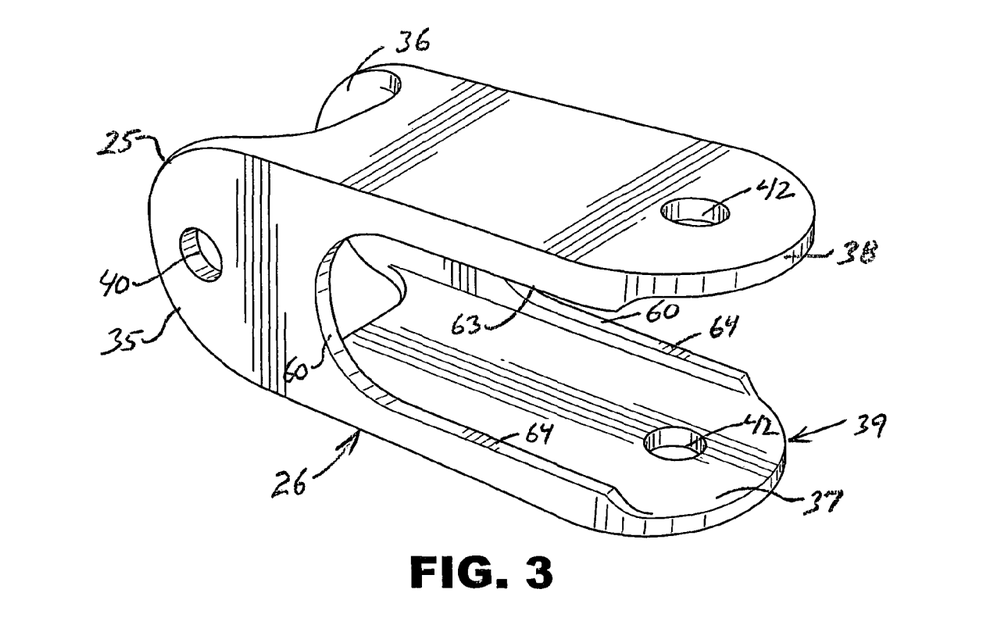
FIG. 3 is a rear perspective view of a U-joint in accordance with the invention.

As shown in FIG. 3, the U-joint coupler 26 of the invention is a single piece member formed of a rugged metal and having pairs of spaced opposing flanges 35 and 36 forming the first end 25 thereof and a pair of spaced and opposing flanges 37 and 38 forming the second end 39 thereof. The flanges 35 and 36 of the first end of the U-joint are oriented vertically and are spaced apart a distance such that the flanges fit on opposite sides of the sleeve 30 when mounted to the knuckle 18 as shown if FIG. 6. Each of the flanges 35 and 36 have aligned openings 40 therein through which the shoulder bolt 24 extends. Generally the openings 40 are just slightly larger that the diameter of the bolt 24 which is preferably a ⅝ inch bolt.

Figure 4:
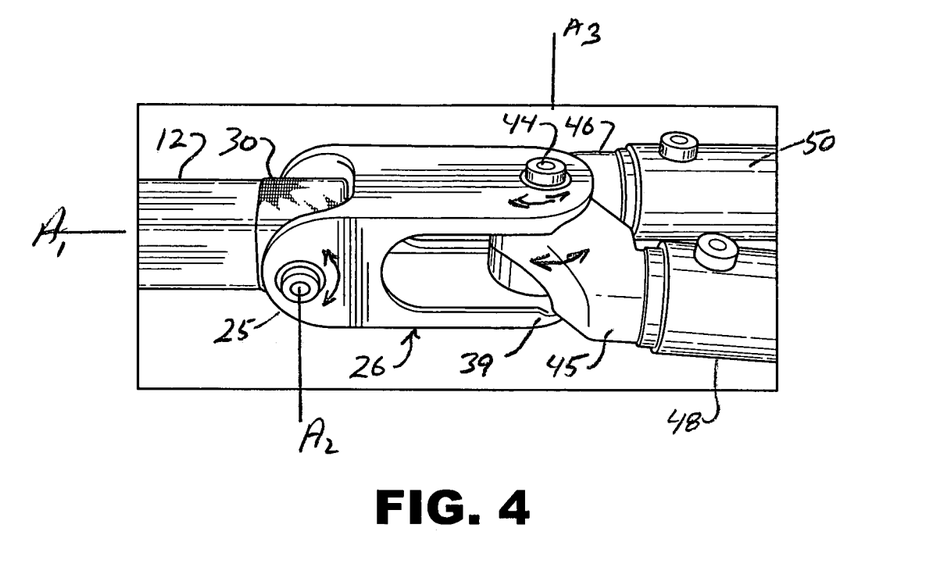
FIG. 4 is a side perspective view showing the U-joint of FIG. 3 joined at a first end to a knuckle mounted to a draw bar and at a second end to a pair of towing arms.

The flanges 37 and 38 of the second end of the U-joint 26 also include aligned openings 42 of a size to receive another shoulder bolt 44 that is used to secure a pair of U-shaped brackets 45 and 46 associated with a pair of pivotally deployable towing arms 48 and 50. As shown in FIG. 4, with the brackets 45 and 46 secured to the shoulder bolt 44, the U-joint 26 is pivotal about a third axis "A3" which is a vertical axis defined by the bolt 44. In a like manner, the brackets 45 and 46 are pivotal relative to the U-joint 26, and thus the towing arms 48 and 50 are also pivotal relative to the U-joint 26.

As shown in FIG. 3, the spaced flanges 37 and 38 of the U-joint 26 are reinforced by integrally formed side walls segments 60 that have upper and lower segments 63 and 64 that extend toward one another. The spacing between the upper and lower flanges 38 and 37 is sufficient to permit the brackets 45 and 46 to be seated between the flanges 37 and 38.

Figure 1:
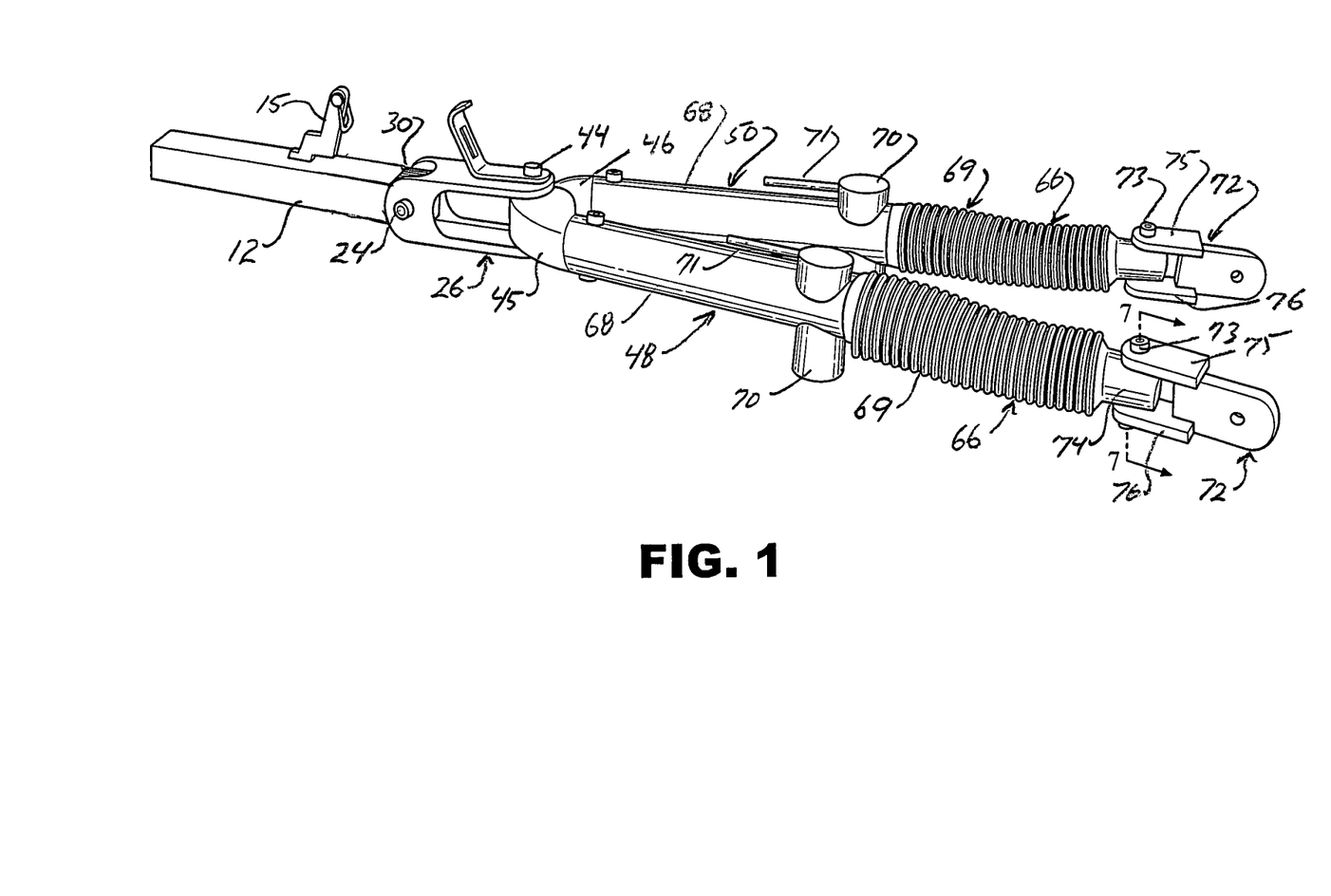
FIG. 1 is a rear perspective view of a tow bar assembly of the present invention.

With reference to FIG. 1, the towing arms 48 and 50 each include an inner portion 66 that is selectively telescopically adjusted to extend from or retract into an outer portion 68 thereof. The inner portions are covered by flexible rubber boots 69 that prevent debris from entering the outer portions 68. A pivotal cam 70 extends through each outer portion of the arms. Handles 71 are mounted to the cams and are used to pivot the cams to a position generally perpendicular to their aligned position shown in the FIG. 1, to allow the inner portion of an arm to be pushed into a retracted position within the outer portion of arm for compact storage. When the cams are returned to the position shown in FIG. 1, the inner portion 66 of each arm may be selectively extended relative to the outer portion 68 to facilitate the connection of mounting clevises or brackets 72 that are pivotally mounted by bolts 73 adjacent the free ends 74 of the inner portion of each arm. Each bracket 72 is secured to a pair of spaced members 75 and 76 that are pivotally mounted to the bolts 73. Each bracket 72 includes an opening for receiving a locking pin that is used to connect the brackets 72 to base plates, not shown, that have been secured, such as by being bolted or welded to a front frame member of the towed vehicle.

Figure 7:
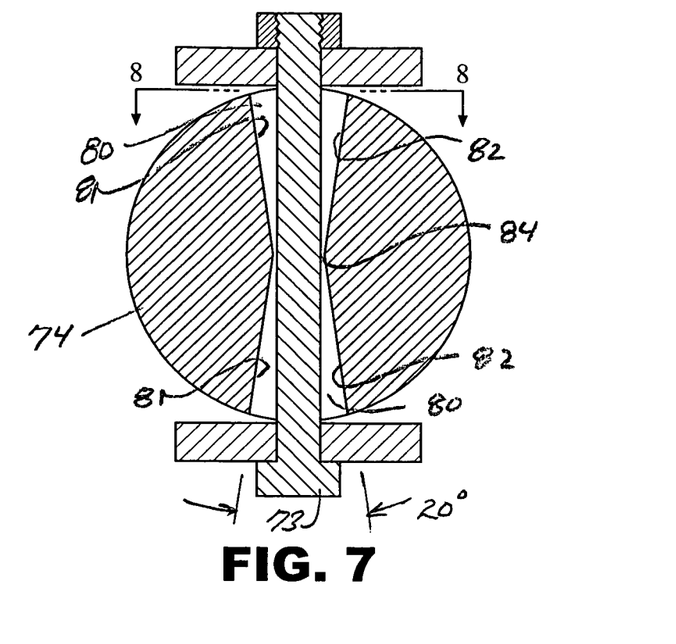
FIG. 7 is an enlarged cross sectional view taken along line 7-7 of FIG. 1.
Figure 8:
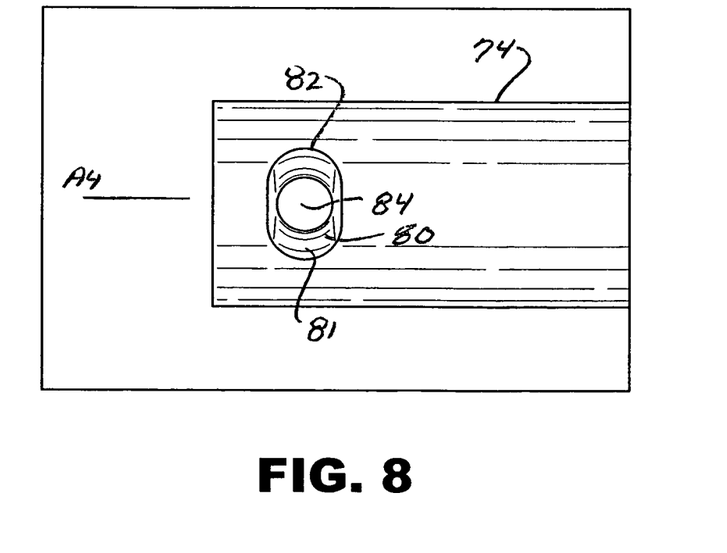
FIG. 8 is a top plan view taken along line 8-8 of FIG. 7 showing a slotted and tapered opening in the free end of an inner portion of one of the towing arms of the invention.

With specific reference to FIGS. 7 and 8, to further facilitate the alignment of the clevises or brackets 72 with the base plates on a towed vehicle, tapered openings 80 are provided in the upper and lower portions of the free ends 74 of the inner portions of the towing arms. The openings are defined by inwardly tapering side walls 81 and 82 that converge to a central opening 84 through which the mounting bolts 73 pass. Generally the angles of the walls 81 and 82 are such as to allow a pivoting motion of 15-200 of the mounting brackets 72 about an elongated central axis "A4" of each arm. Thus, two degrees of pivotal adjustment are provided between the mounting brackets and the base plates of a towed vehicle.

Figure 9:
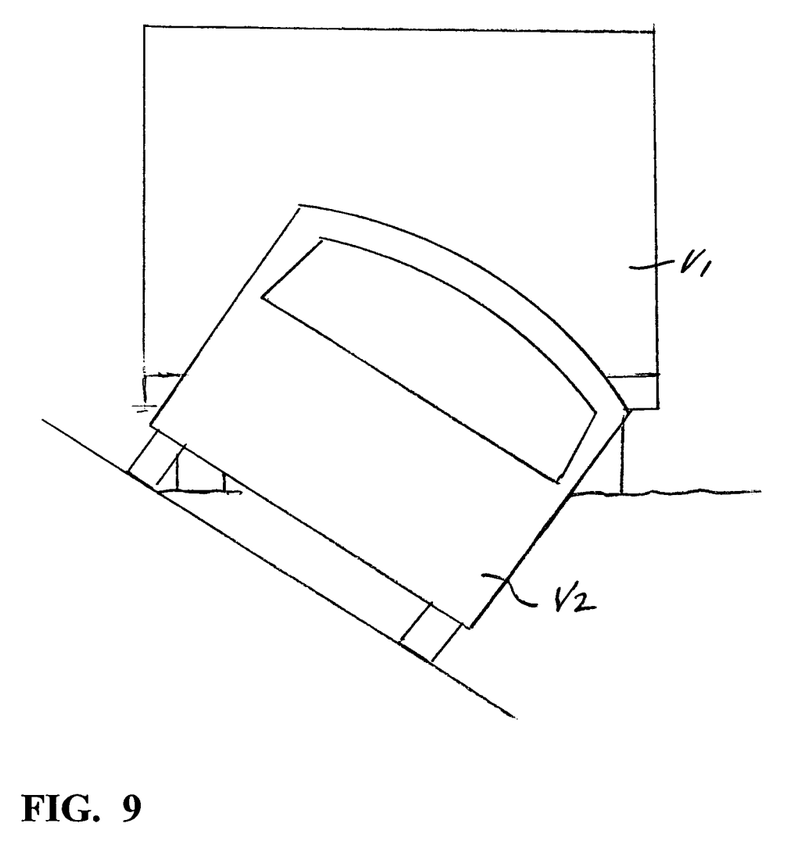
FIG. 9 is an illustration view showing how the two bar assembly of the invention permits relative rotation between the towing vehicle and the towed vehicle without placing adverse stress on the components of the assembly.

By way of example, FIG. 9 illustrates how a towed vehicle may pivot about the axis "A1" of the hitch receiver of a towing vehicle so as to thereby reduce stress on the components of the tow bar assembly.

It should be noted that the tow bar assembly may include only the combination knuckle and draw bar with the low friction sleeve and the U-joint coupler. In such embodiments, the U-joint coupler is pivotally secured to brackets associated with conventional or prior art hitch or two arms that are designed to be connected to base plates mounted to a towed vehicle.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. A universal tow bar assembly for connecting a double arm tow hitch member for a towed vehicle to a hitch receiver of a towing vehicle, the tow bar assembly comprising; a knuckle member mounted to a draw bar that is receivable within the hitch receiver of the towing vehicle, the knuckle member being cylindrical and having a pair of generally aligned vertically extending open slots therein, a U-joint coupler having oppositely oriented first and second ends defined by pairs of opposing generally parallel and spaced flanges with the flanges of each pair having aligned openings therein, the pair of flanges of the first end being oriented in a first direction and the pair of flanges of the second end being oriented in a second direction that is perpendicular to the first direction, a first pivot member extending through the aligned openings in the pair of flanges of the first end of the U-joint coupler and through the aligned open slots in the knuckle member such that the U-joint coupler is pivotal with the first pivot member about a first pivot axis defined by an elongated central axis of the draw bar and the knuckle member and such that the U-joint coupler is also pivotal about a second pivot axis defined by an orientation of the first pivot member relative to the knuckle member, and the aligned opening in the pair of flanges of the second end of the U-joint coupler being adapted to receive a second pivot member associated with the tow hitch member such that the second end of the U-joint coupler is pivotal relative to the tow hitch member about a third vertical pivot axis, whereby the tow bar assembly permits universal pivoting motion between the towing vehicle and the towed vehicle.

2. The universal tow bar assembly of claim 1 including a sleeve mounted intermediate the first end of the U-joint coupler and the knuckle member, the sleeve having opposite openings there through of a size to closely receive the first pivot member therein such that said sleeve pivots with the U-joint coupler about the first pivot axis.

3. The universal tow bar assembly of claim 2 wherein said open slots in the knuckle member include tapering walls that extend to a central opening of a size complementary to the size of the first pivot member.

4. The universal tow bar assembly of claim 3 wherein the open slots permit a rotation about the first pivot axis of up to approximately 90°.

5. The universal tow bar assembly of claim 1 wherein the open slots permit a rotation about the first pivot axis of up to approximately 90°.

6. The universal tow bar assembly of claim 5 wherein at least the pair of flanges of the second end of the U-joint coupler have reinforced edges extending along opposite sides thereof.

7. A universal tow bar assembly for connecting a towed vehicle to a hitch receiver of a towing vehicle, the universal tow bar assembly comprising; a knuckle member mounted to a draw bar that is receivable within the hitch receiver of the towing vehicle, the knuckle member being cylindrical and having a pair of generally aligned vertically extending open slots therein, a U-joint coupler having oppositely oriented first and second ends defined by pairs of opposing generally parallel and spaced flanges with the flanges of each pair having aligned openings therein, the pair of flanges of the first end being oriented in a first direction and the pair of flanges of the second end being oriented in a second direction that is perpendicular to the first direction, a first pivot member extending through the aligned openings in the pair of flanges of the first end of the U-joint coupler and through the aligned open slots in the knuckle member such that the U-joint coupler is pivotal with the first pivot member about a first pivot axis defined by an elongated central axis of the draw bar and the knuckle member and such that the U-joint coupler is also pivotal about a second pivot axis defined by an orientation of the first pivot member relative to the knuckle member, and the aligned openings in the pair of flanges of the second end of the U-joint coupler being adapted to receive a second pivot member associated with a tow hitch member having at least one arm that extends from the second end of the U-joint coupler to a mounting bracket for connection to the towed vehicle and such that the U-joint coupler is pivotal relative to the tow hitch member about a third vertical pivot axis, whereby the tow bar assembly permits universal pivoting motion between the towing vehicle and the towed vehicle.

8. The universal tow bar assembly of claim 7 including a sleeve mounted intermediate the first end of the U-joint coupler and the knuckle member, the sleeve having opposite openings there through of a size to closely receive the first pivot member therein such that said sleeve pivots with the U-joint coupler about the first pivot axis.

9. The universal tow bar assembly of claim 8 wherein said open slots in the knuckle member include tapering walls that extend to a central opening of a size complementary to the size of the first pivot member.

10. The universal tow bar assembly of claim 9 wherein the open slots permit a rotation about the first pivot axis of up to approximately 90°.

11. The universal tow bar assembly of claim 7 wherein the open slots permit a rotation about the first pivot axis of up to approximately 90°.

12. The universal tow bar assembly of claim 11 wherein at least the pair of flanges of the second end of the U-joint coupler have reinforced edges extending along opposite sides thereof.

13. The universal tow bar assembly of claim 7 wherein the mounting bracket is pivotally connected to the at least one arm so as to pivot about two axes that are oriented perpendicularly relative to one another.

14. The universal tow bar assembly of claim 7 wherein the tow hitch member includes a pair of arms pivotally mounted to the second end of the U-joint coupler so as to be pivotal about the third pivot axis.

15. The universal tow bar assembly of claim 14 wherein each arm has an inner portion that is selectively extendable and retractable relative to an outer portion thereof, and means for retaining the inner portion in an extended position when extended from the outer portion.

16. The universal tow bar assembly of claim 15 wherein the mounting bracket of each arm is pivotally connected adjacent a free end of each arm so as to pivot about two axes that are oriented perpendicularly relative to one another.

17. The universal tow bar assembly of claim 16 wherein a pair of tapered openings are aligned on opposite sides of the free end of the inner portion of each arm and have walls that taper inwardly toward one another to a central opening in the free end, and wherein the tow bar assembly further comprises a third pivot member for mounting each of the mounting brackets to the pair of tapered openings.

\* \* \* \* \*